March 12, 1963     H. ALLEN     3,080,883
LUBRICATED VALVE
Filed Oct. 25, 1960
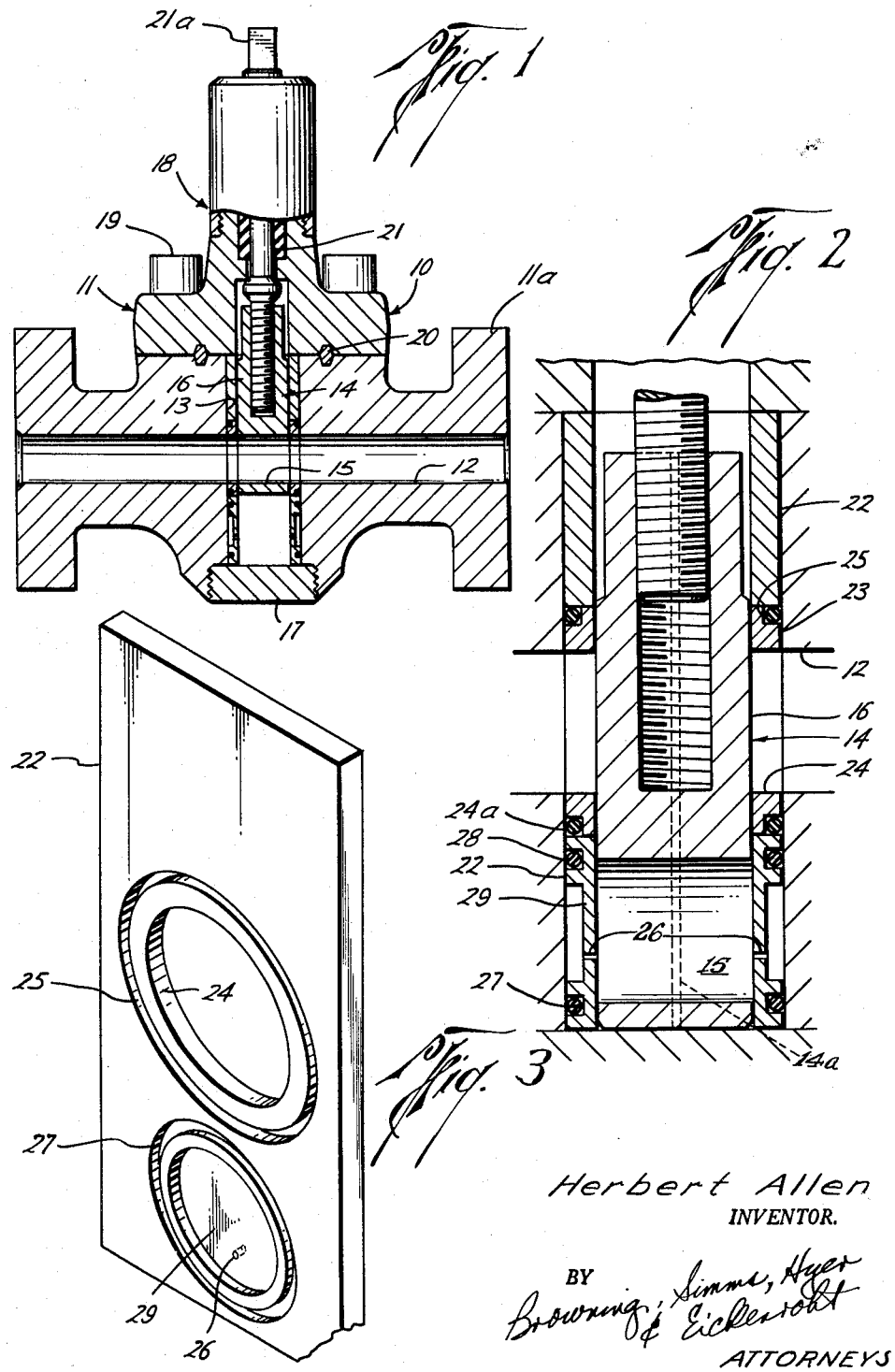
Herbert Allen
INVENTOR.

United States Patent Office 3,080,883
Patented Mar. 12, 1963

3,080,883
LUBRICATED VALVE
Herbert Allen, Houston, Tex., assignor to Cameron Iron Works, Inc., Houston, Tex., a corporation of Texas
Filed Oct. 25, 1960, Ser. No. 64,849
3 Claims. (Cl. 137—246.13)

This invention relates generally to valves, and more particularly to improvements in lubricated, conduit-type gate valves.

In this particular type of valve, the gate is longitudinally reciprocal within a cavity which intersects opposite sides of a flowway through the valve body. The gate has a port through it which is aligned with the flowway in the open position of the valve and a solid portion which is disposed across the flowway to close same in another position of the gate. In this latter position, the port in the gate is disposed within one side of the body cavity.

As the gate is moved from opened to closed position, the line fluid in its port is prevented from mingling with lubricant contained in the body cavity by means of plates held tightly against opposite sides of the gate and mounting annular seats to connect the gate port with the flowway. More particularly, the plates cover the opposite sides of the gate port in the closed position of the gate so that each has an unsupported area in such position.

Ordinarily, this unsupported plate area presents no particular problem, even though the lubricant may provide a seal between the adjacent faces of the gate and the plates which prevents pressure equalization across the plates, because the fluid pressure within the gate port is substantially equal to the pressure within the body cavity at the time the gate closes. However, when the line pressure increases so as to increase the fluid pressure between the outer side of a plate and the body cavity above that pressure within the gate port, the pressure differential may become great enough to cause the unsupported area of the plate to fail.

An object of this invention is to provide a valve of this type in which the plate will not fail even when the pressure within the body cavity is raised a considerable amount above that within the gate port.

Other objects, advantages and features of this invention will be apparent to one skilled in the art upon a consideration of the written specification, the attached claims and the annexed drawings.

In the drawings, wherein like reference characters are used throughout to designate like parts:

FIG. 1 is a longitudinal sectional view of a valve constructed in accordance with the present invention, and with the gate thereof in the open position;

FIG. 2 is a partial view of the valve of FIG. 1 on an enlarged scale and showing the gate moved to a closed position between the plates on opposite sides thereof; and FIG. 3 is a perspective view of the outer side of one of the plates including the seat mounted therein removed from the valve body cavity.

With reference now to the above-described drawings, the valve 10 shown in FIG. 1 comprises a valve body 11 having a flowway 12 therethrough and a cavity 13 therein intersecting opposite sides of the flowway. A gate 14 having a port 15 therethrough is longitudinally reciprocal within the cavity between a position aligning the port with the flowway (FIG. 1) to open the valve and another position disposing a solid portion 16 of the gate across the flowway (FIG. 2) to close same. As previously mentioned, in this latter position of the gate, the port 15 is disposed within the lower side of the body cavity. The opposite ends of the body have flanges 11a or other suitable means for connecting it in a flow line.

The cavity is closed on its lower end by means of a cover or plug 17 and at its upper end by means of a bonnet 18 mounted on an upper portion of the body 11 and connected, as by bolts 19, to the remainder of the body. An annular ring gasket 20 or other suitable means seals between these separate portions of the valve body. Upon disconnection of the upper portion from the remainder of the valve, the gate 14 as well as the plates to be described may be removed for replacement or repair.

The upper end of the gate 14 is threadedly connected to a stem 21 which is of the non-rising type in that it is supported within the bonnet 18 in a conventional manner (not shown) for rotation without longitudinal movement. Thus, a suitable tool may be connected to the non-circular upper end 21a of the stem extending above the bonnet for imparting rotation to the stem and thus longitudinal movement to the gate.

As previously mentioned, this invention contemplates that a lubricant may be contained within the body cavity above and below the ends of the gate 14. As well known in the art, these lubricant chambers are connected by a groove to provide for circulation of lubricant between the ends of the gate. For example, a groove 14a may extend, as indicated in FIG. 2, between opposite ends of the gate and to one side of the port 15 therein. In order to prevent the line fluid within the flowway 12 from mingling with this lubricant, and in accordance with the aforementioned conventional practice, a plate 22 is disposed within the body cavity on each side of the gate to cover opposite sides of the gate port 15 in its closed position (FIG. 2). More particularly, the plates 22 are held tightly against the opposite sides of the gate to guide it in its longitudinal reciprocation, and each mounts an annular seat 23 having a port 24 therethrough connecting the flowway 12 with the gate port 15 in the open position of the gate.

Obviously, the seats may be removable from the plates, as shown, or may be integral therewith. In either case, they are located axially of the flowway and gate port by virtue of the engagement of the opposite ends of each plate between the lower side of the upper body portion and the plug 17 on the lower end of the body cavity 13. Each seat may also carry an O-ring 24a or other annular seal element within groove 25 about its outer circumference for sealing with respect to the plate 22 in which it is mounted.

As previously mentioned, the lubricant within the body cavity often provides a seal between the opposite sides of the closed gate 14 and the inner sides of the plate 22. As a result, in prior valves of this general type, an increase in fluid pressure within the line and between the body cavity and outer side of a plate over that existing at the time of closing of the gate could create a pressure differential across the area of the plate opposite the gate port 15. If this differential became too great, this unsupported plate area could fail.

However, in accordance with the present invention, each plate 22 has a vent 26 therein which connects the gate port 15 in the closed position of the gate with the outer side of the plate, as shown in FIG. 2, to equalize the pressure thereacross. More particularly, the outer side of each plate has a groove 27 thereabout which receives an O-ring 28 (removed from FIG. 3) or other annular sealing member for sealing engagement between the plate and adjacent side of the body cavity in surrounding relation to the vent 26. This prevents the lubricant within the body cavity from flowing through the vent 26 and into the gate port, and thereby contaminating the line fluid upon opening of the gate.

Preferably, the O-ring 28 is arranged coaxially of the port 15 so as to define a pressure area on the outside of each plate which is equal to and concentric of the cross-sectional area of the gate port at its intersection with the inner side of the plate. In any case, the area within the O-ring 28 should be a least as large as the area of the gate port 15 so that there is no unsupported area of the plate subject to any pressure differential which might develop across the plate.

In the preferred form of the invention shown in the drawings, the outer side of each plate 22 is recessed at 29 within the O-ring 28 and over a portion which is intersected by the outer end of the vent 26. This reduces the possibility of the vent being clogged by any material which might become lodged between each plate and body cavity within the O-ring 28 and thereby prevent pressure equalization across the unsupported area of the plate.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A lubricated valve, comprising a body having a flowway therethrough and a cavity therein intersecting opposite sides of the flowway, a gate having a port therethrough, means for reciprocating the gate within the cavity between a position in which its port is aligned with the flowway to open same and another position in which a solid portion on the gate is disposed across the flowway to close same and the port is disposed within one side of the cavity, a plate between each side of the gate and the body cavity mounting an annular seat to connect the flowway and gate port in the open position of the gate and covering opposite sides of the gate port in the closed position of the gate, means connecting the cavity on opposite ends of the gate to permit lubricant to flow therebetween during opening and closing of the gate, annular seal means between each plate and the body cavity for excluding said lubricant in said cavity from an area on the outer side of the plate substantially concentric of and equal to the area of the inner side of the plate opposite the port of the gate in its closed position, and a vent in each plate connecting said areas.

2. A lubricated valve of the character defined in claim 1, wherein the area on the outer side of each plate has a relieved portion with which the vent connects.

3. A lubricated valve, comprising a body having a flowway therethrough and a cavity therein intersecting opposite sides of the flowway, a gate having a port therethrough, means for reciprocating the gate within the cavity between a position in which the port is aligned with the flowway to open same and another position in which a solid portion of the gate is disposed across the flowway to close same and said port is disposed within one side of the cavity, a plate held tightly against each side of the gate within the body cavity to cover both sides of the gate port in the closed position of the gate and mounting an annular seat to connect the flowway and gate port in the open position of said gate, means connecting the cavity on opposite ends of the gate to permit lubricant to flow therebeween during opening and closing movement of the gate, a seal ring between each plate and the body cavity surrounding and sealing off lubricant in the cavity from an area on the outer side of the plate substantially opposite to and at least as large as the area of the gate port adjacent the inner side of said plate when the gate is closed, and a vent in each plate connecting the surrounded area thereon with the gate port.

References Cited in the file of this patent
UNITED STATES PATENTS

| | | |
|---|---|---|
| 1,769,386 | Orton | July 1, 1930 |
| 2,230,600 | Olson | Feb. 4, 1941 |
| 2,657,898 | Volpin | Nov. 3, 1953 |